United States Patent
Chung et al.

(10) Patent No.: US 8,549,895 B2
(45) Date of Patent: Oct. 8, 2013

(54) AIR FILTER LEAK INSPECTION METHOD

(75) Inventors: Yang-You Chung, Taipei (TW); Ming-Chuan Hu, Taipei County (TW); Chia-Chun Su, Taipei County (TW)

(73) Assignee: Taiwan Textile Research Institute, New Taipei (TW)

( * ) Notice: Subject to any disclaimer, the term of this patent is extended or adjusted under 35 U.S.C. 154(b) by 864 days.

(21) Appl. No.: 12/636,054

(22) Filed: Dec. 11, 2009

(65) Prior Publication Data
US 2011/0107819 A1 May 12, 2011

(30) Foreign Application Priority Data

Nov. 10, 2009 (TW) .............................. 98138098 A

(51) Int. Cl.
*G01M 3/20* (2006.01)
(52) U.S. Cl.
USPC .............................................. 73/40.7; 73/40
(58) Field of Classification Search
USPC ........................................ 73/40.7, 40; 96/413
See application file for complete search history.

(56) References Cited

U.S. PATENT DOCUMENTS

| 4,494,403 | A | | 1/1985 | Bowers et al. |
| 4,875,360 | A | * | 10/1989 | Ziemer ........................... 73/40.7 |
| 7,010,960 | B1 | * | 3/2006 | Grantham ......................... 73/40 |
| 7,658,787 | B2 | * | 2/2010 | Morse et al. ..................... 95/273 |

* cited by examiner

*Primary Examiner* — Daniel Larkin
(74) *Attorney, Agent, or Firm* — J.C. Patents

(57) ABSTRACT

An air filter leak inspection method is provided. First, an aerosol to be filtered containing particles is passed through an air filter having a first edge and a second edge. Next, a leakage inspection unit is provided. The leakage inspection unit includes n probes, wherein n indicates a positive integer. Afterward, a moving procedure is set to make the probes traverse between the first edge and the second edge, thereby scanning the whole portions of the air filter. When the probes move to the second edge, the probes move along the extending direction of the second edge with a designed distance, wherein the designed distance is less than the length of each probe. Besides, the number of times that the probes traversing between the first and the second edge is determined according to the amount of the probe, the length of each probe and the height of the air filter.

14 Claims, 6 Drawing Sheets

AIR FILTER LEAK INSPECTION METHOD

CROSS-REFERENCE TO RELATED APPLICATION

This application claims the priority benefit of Taiwan application serial no. 98138098, filed on Nov. 10, 2009. The entirety of the above-mentioned patent application is hereby incorporated by reference herein and made a part of specification.

BACKGROUND OF THE INVENTION

1. Field of the Invention

The present invention relates to an air filter leak inspection method, more particularly relates to an air filter leak inspection method having high inspection efficiency, good accuracy and can avoid equipment damage.

2. Description of Related Art

With the progress in human industrial technology, air cleanness poses a significant impact on fabrication process, environmental safety and equipment in many new types of the laboratories, hospitals and the factories, even the suspended particles with 0.5 μm/ft³ of the air in some environment are required to be lower than 1. In order to obtain the air with high cleanness, air filter of HEPA (High Efficiency Particulate Air, HEPA) or ULPA (Ultra-Low Particulate Air, ULPA) is needed to filter the outside air. However, if the air filter with high efficiency leaks in the fabrication process, the air filter will lose its original filtering capability, thereby causing critical effects to the fabrication process, environmental safety and equipment. Therefore, in order to improve the reliability of the air filter, it is needed to inspect whether the air filter leaks or not.

U.S. Pat. No. 4,494,403 discloses an air filter leak inspection method, wherein the probe traverses across one side of the air filter to inspect the air filter. However, when performing the air filter leak inspection, the probe in moving may go beyond the range of the air filter with the difference of the size of the air filter to be inspected and the number of the probes to be used. Hence, the probe can't be effectively used to perform the inspection, more than that, the probe may hit the frame for fixing the air filter or baffle plate so as to cause equipment damage. Therefore, there still needs improvement in the conventional air filter leak inspection method.

SUMMARY OF THE INVENTION

The present invention provides an air filter leak inspection method, which can improve the air filter leak inspection efficiency and accuracy, and avoid equipment damage.

The present invention provides an air filter leak inspection method comprising the following steps. First, passing an aerosol to be filtered containing particles through an air filter from one side of the air filter, wherein the air filter has a first edge and a second edge parallel to each other. Next, providing a leakage inspection unit at the other side of the air filter, wherein the leak inspection unit includes n probes, and n indicates a positive integer, and the probes face to the air filter. Then, a moving procedure is set to traverse the probes between the first edge and the second edge, thereby scanning the entirety of the air filter. When the probes move to the second edge, the probes move along the extending direction of the second edge for a designed distance, wherein the designed distance is less than the length of each probe, and the number of times that the probes traverse between the first edge and the second edge is determined according to the amount of the probes, the length of the each probe and the height of the air filter.

According to an embodiment of the invention, the probes move from the first edge to the second edge along a horizontal direction or move from the second edge to the first edge along the horizontal direction, and the horizontal direction is orthogonal to the extending direction of the second edge.

According to an embodiment of the invention, at the step of setting the moving procedure, determining the number of times that the probes traverse between the first edge and the second edge is determined in accordance with formula (1), $$(n \times 2) \times i \times w \geq ((n \times 2) \times i - 1) \times C + y \qquad \text{formula (1)}$$

wherein n represents the number of the probes, i represents the number of times that the probes traverse between the first edge and the second edge, w represents the length of each probe, C represents a compensation value, and y represents the height of the air filter.

According to an embodiment of the present invention, C is equal to 5.

According to an embodiment of the present invention, the air filter is fixed to a frame.

According to an embodiment of the present invention, the position of each probe before moving along the extending direction of the second edge for the designed distance forms an overlapping area with the position of each probe after moving along the extending direction of the second edge for the designed distance, and the overlapping area is determined using formula (2), $$OL = \frac{((n \times 2) \times (i/2) \times w) - (y - (fw \times 2) + 2)}{(((n \times 2) \times (i/2) \times w) - 1) - w} \qquad \text{formula (2)}$$

wherein OL represents the overlapping area, n represents the number of the probes, i represents the number of times that the probes traversing between the first edge and the second edge, w represents the length of each probe, y represents the height of the air filter, and fw represents the width of the frame.

According to an embodiment of the present invention, the step of setting the moving procedure further includes determining the designed distance of the probes moving along the extending direction of the second edge according to the overlapping area.

According to an embodiment of the present invention, the leakage inspection unit comprises a plurality of probes.

According to an embodiment of the present invention, before moving the probes, the distance between the probes is adjusted according to formula (3), $$G = OL \times 2 - W \qquad \text{formula (3)}$$

wherein G represents the distance between two adjacent probes, OL represents the overlapping area, and w represents the length of each probe.

According to an embodiment of the present invention, the step of setting the moving procedure further includes moving the probes to a $j^{th}$ starting position before the probes traverse between the first edge and the second edge in the $j^{th}$ time, wherein j indicates a positive integer, and j is under or equal to the number of times that the probes traverse between the first edge and the second edge.

According to an embodiment of the present invention, at the step of setting the moving procedure, moving each probe to the $j^{th}$ starting position according to formula (4), $$P_j = (w+G) \times n + PO + P_{j-1} \qquad \text{formula (4)}$$

wherein $P_j$ represents the $j^{th}$ starting position, $P_{j-1}$ represents the $j-1^{th}$ starting position, w represents the length of each probe, G represents the distance between two adjacent probes, and PO represents a probe offset compensation parameter.

According to an embodiment of the present invention, the probe offset compensation parameter is equal to the designed distance.

According to an embodiment of the present invention, at the step of setting the moving procedure, a moving speed of the probe is set.

According to an embodiment of the present invention, the moving speed of the probes is set between 20 mm/s to 150 mm/s.

According to an embodiment of the present invention, the leakage inspection unit further includes a transmission mechanism, n particle counters and a back-end processing unit. The probes are disposed on the transmission mechanism, and the transmission mechanism is suitable for carrying and moving the probes. Each particle counter is connected to one of the probes. The back-end processing unit connects to the transmission mechanism and the particle counters, so as to control the motion of the transmission mechanism, and readout and process the output signal of the particle counters.

In view of the above, the air filter leak inspection method of the present invention determines the moving path of the probes according to the probes used and the size of the air filter. Moreover, when the probes move around the filter in cycles, a part of the scanning area is overlapped. Therefore, the air filter leak inspection method in the present invention can improve the air filter leak inspection efficiency and accuracy, and avoid equipment damage.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
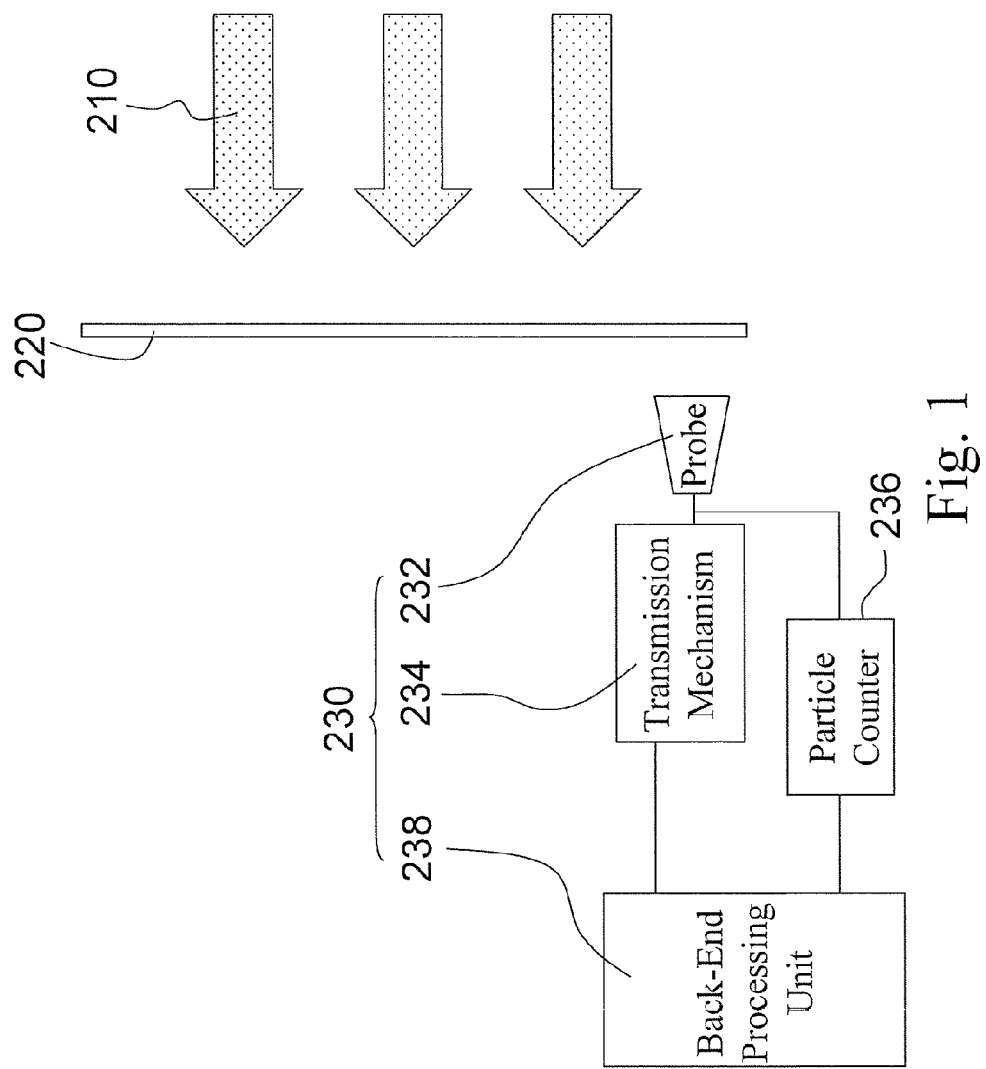
FIG. 1 is a schematic side view showing a leak inspection process performed on an air filter according to an embodiment of the present invention.
Figure 2:
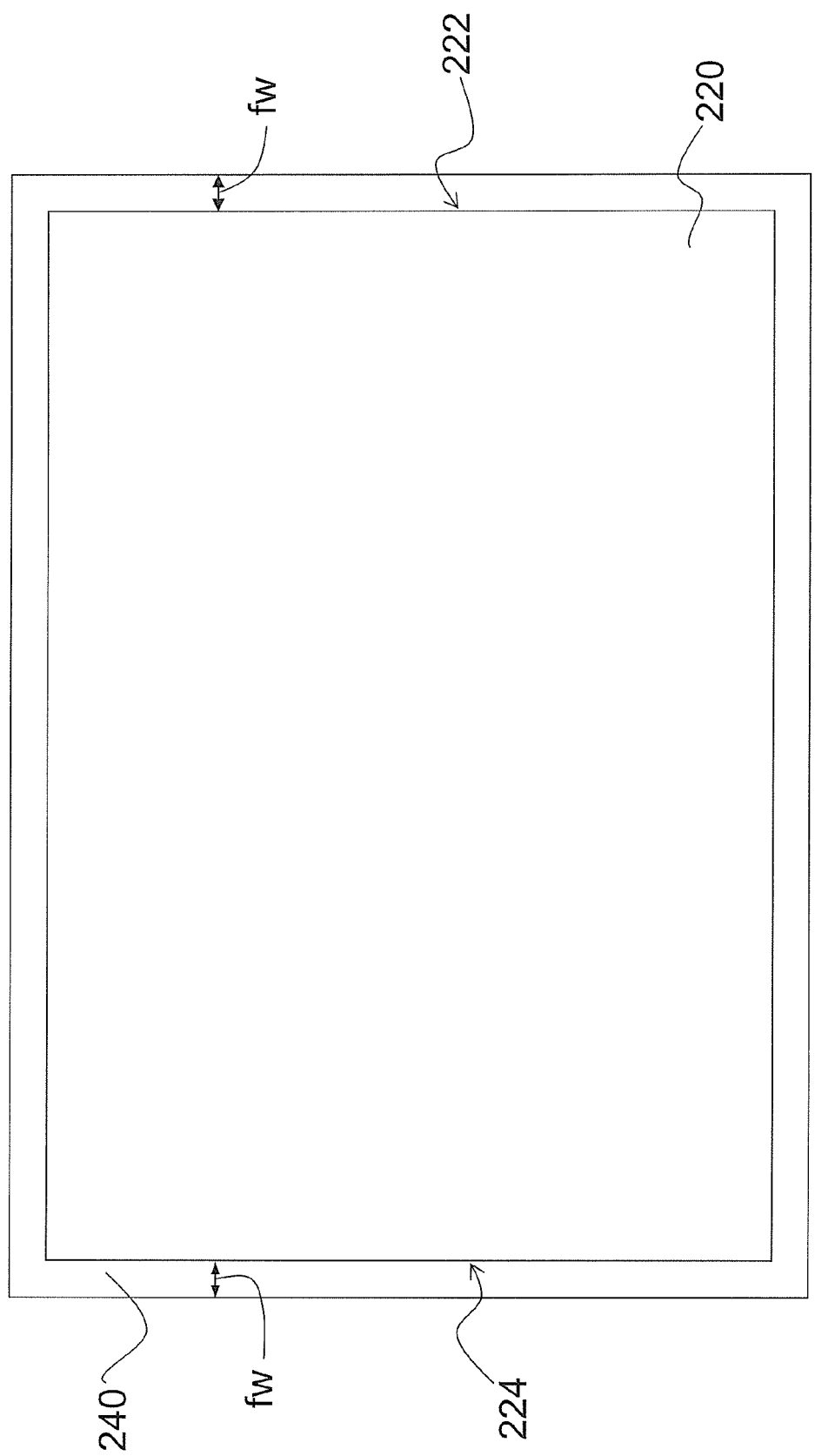
FIG. 2 is a schematic view facing the air filter depicted in FIG. 1.

FIG. 1 is a schematic side view showing a leak inspection process performed on an air filter according to an embodiment of the present invention. FIG. 2 is a schematic view facing the air filter depicted in FIG. 1. Referring to FIG. 1 and FIG. 2, first, passing an aerosol to be filtered containing particles 210 through an air filter 220 from one side of the air filter 220, wherein the air filter 220 has a first edge 222 and a second edge 224 parallel to each other. In this embodiment, the air filter 220, for example, is fixed to a frame 240 so that the later leak inspection may be performed conveniently.

Next, a leakage inspection unit 230 is provided at the other side of the air filter 220. In this embodiment, the leakage inspection unit 230 includes, for example, a probe 232, and the probe 232 is facing the air filter 220. It should be noted herein that even though one probe 232 is illustrated as being used in the present embodiment, in fact, two or more than two probes 232 can be used according to the actual need, as described in detail hereinafter.

In this embodiment, the leakage inspection unit 230 further includes a transmission mechanism 234, a particle counter 236 and a back-end processing unit 238. The probe 232 is disposed on the transmission mechanism 234, and the transmission mechanism 234 is suitable for carrying and moving the probe 232. In this embodiment, the transmission mechanism 234 is, for example, a three-axis mechanical arm or other apparatus suitable for carrying and moving the probe 232. The particle counter 236 is connected to the probe 232, and the particle counter 236 in this embodiment is, for example, an optical particle counter. In other embodiments, for example, more than two probes can be used. At this occasion, each particle counter is connected to one of the probes, so as to inspect the leakage location or the leakage quantity of the air filter, respectively.

The back-end processing unit 238 connects to the transmission mechanism 234 and the particle counter 236, so as to control the motion of the transmission mechanism 234, and readout and process the output signal of the particle counter 236. In detail, the back-end processing unit 238 in this embodiment further includes, for example, a plurality of interface cards, such as servo motor control cards, counter cards, RS232 communication cards, signal I/O card or other interface cards.

Figure 3:
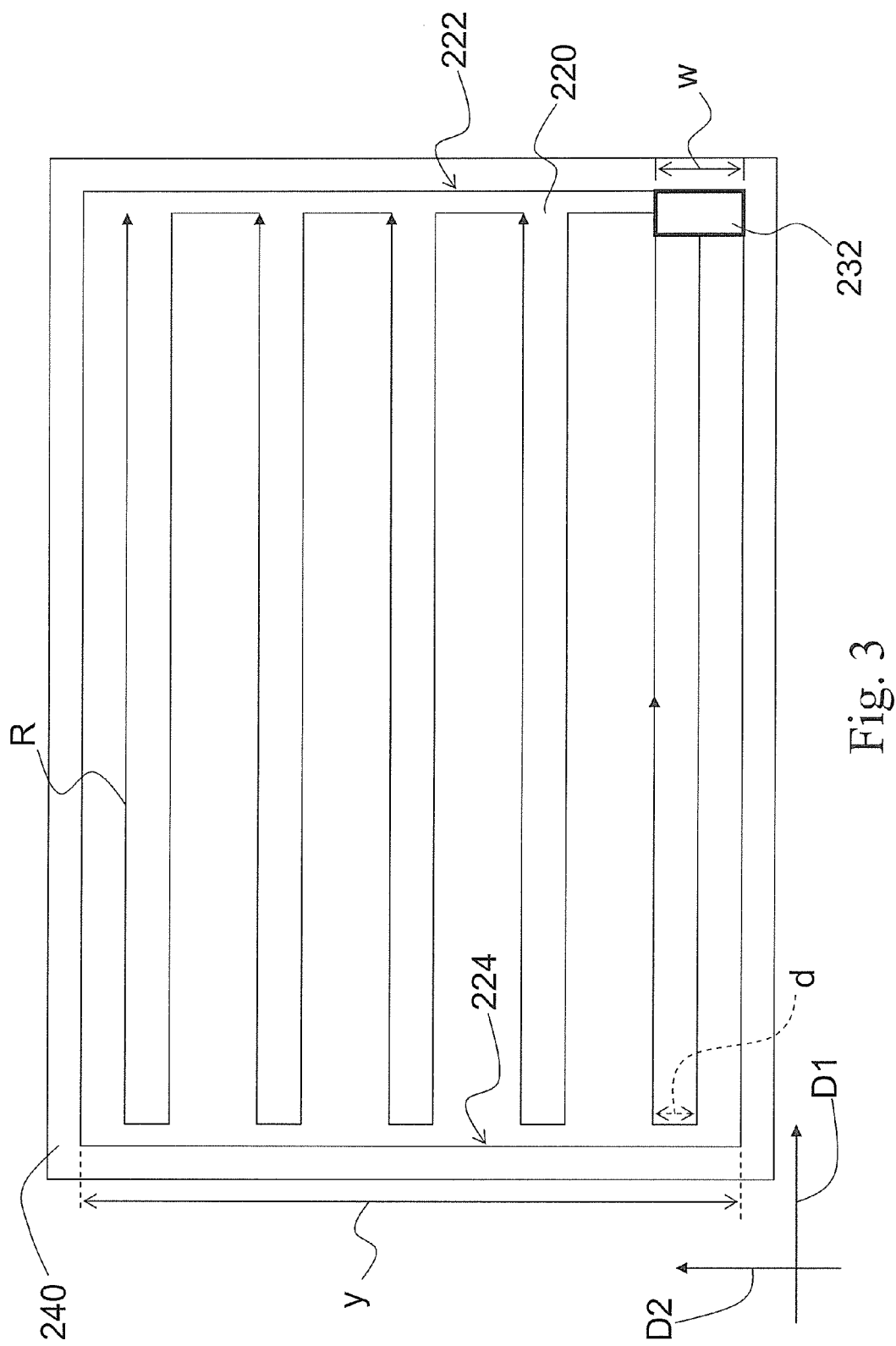
FIG. 3 is a schematic view showing a moving path of the air filter leak inspection performed by using one probe according to an embodiment of the present invention.

FIG. 3 is a schematic view showing a moving path of the air filter leak inspection performed by using one probe according to an embodiment of the present invention. Then, referring to FIG. 3, a moving procedure is set to traverse the probe 232 between the first edge 222 and the second edge 224, thereby scanning the entirety of the air filter 220. When the probe 232 moves to the second edge 224, the probe 232 moves along an extending direction D2 of the second edge 224 for a designed distance d, wherein the designed distance d is less than the length w of probe 232, and the number of times that the probe 232 traverses between the first edge 222 and the second edge 224 is determined according to the number of the probes adopted in the leakage inspection unit 230 (i.e., the probe 232), the length w of the probes adopted in the leakage inspection unit 230 (i.e., the probe 232) and the height y of the air filter 220. The moving path of the probe 232 shown in FIG. 3 only serve as an example to facilitate illustration and is not intended to limit the present invention.

The single traverse of the probe 232 includes the probe 232 moving from the first edge 222 to the second edge 224, and moving from the second edge 224 to the first edge 222. Moreover, the probe 232 moves from the first edge 222 to the second edge 224 along the horizontal direction D1, or moves from the second edge 224 to the first edge 222 along the horizontal direction D1, wherein the horizontal direction D1 is orthogonal to the extending direction D2 of the second edge 224.

Specifically, at the step of setting the moving procedure, for example, the following formula (1) is provided to determine the number of times that the probe 232 transverses between the first edge 222 and the second edge 224, $$(n \times 2) \times i \times w \geq ((n \times 2) \times i - 1) \times C + y \qquad \text{formula (1)}$$

wherein n represents the number of the probes adopted in the leakage inspection unit 230 (i.e., the probe 232), i represents the number of times that the probe 232 traverses between the first edge 222 and the second edge 224, w represents the length of each of the probes adopted in the leakage inspection unit 230 (i.e., the probe 232), C represents a compensation value, and y represents the height of the air filter 220. In this embodiment, the compensation value C is equal to 5.

Figure 4:
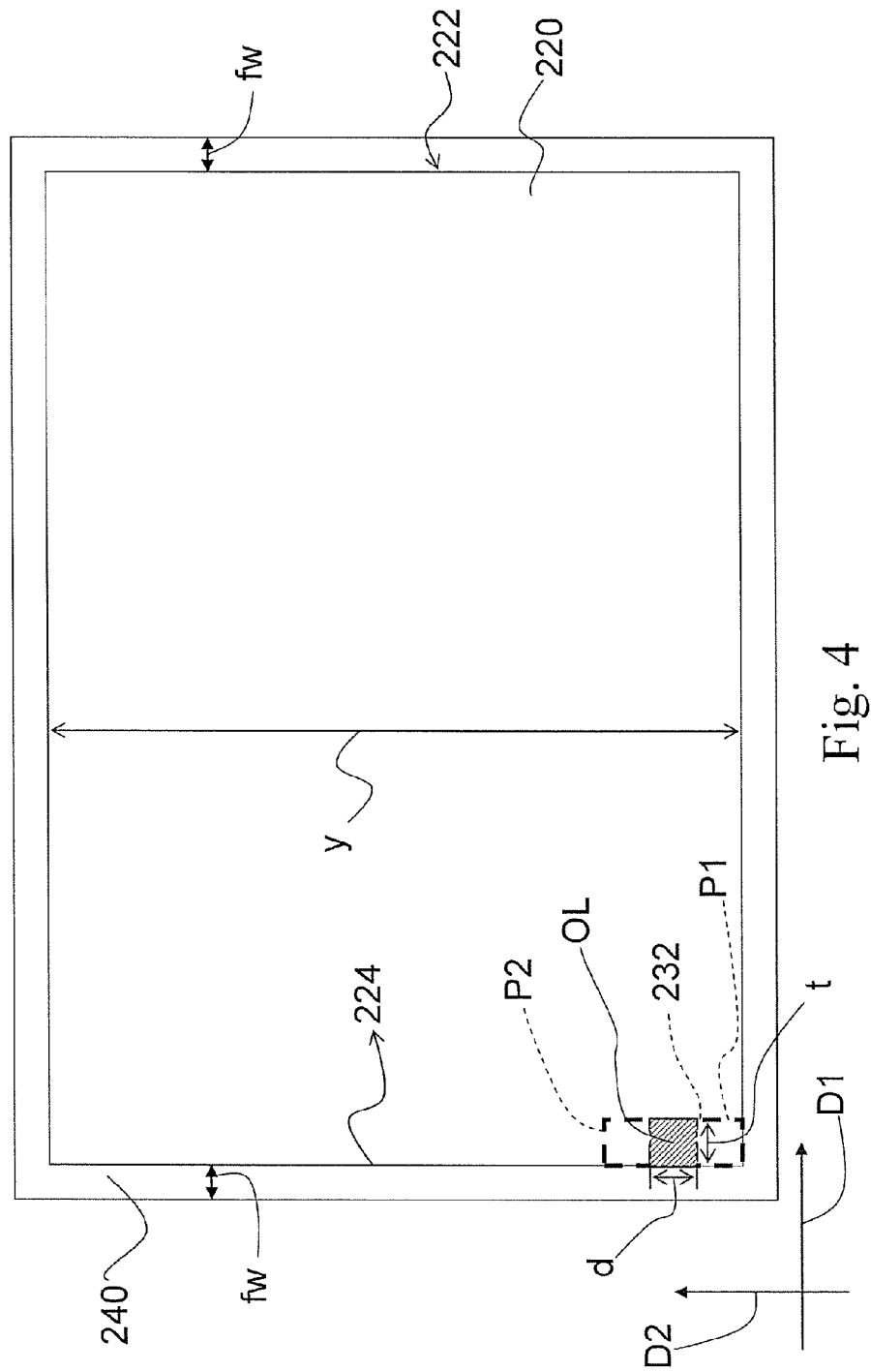
FIG. 4 is a schematic view showing that the positions of the probe depicted in FIG. 3 before and after the probe moves the designed distance.

FIG. 4 is a schematic view showing the positions of the probe depicted in FIG. 3 before and after the probe moves for the designed distance. Referring to FIGS. 3 and 4, in this embodiment, the position P1 of the probe 232 before moving along the extending direction D2 of the second edge 224 for the designed distance d forms an overlapping area OL with the position P2 of the probe 232 after moving along the extending direction D2 of the second edge 224 for the designed distance d, and the overlapping area OL is represented by formula (2), $$OL = \frac{((n \times 2) \times (i/2) \times w) - (y - (fw \times 2) + 2)}{(((n \times 2) \times (i/2) \times w) - 1) - w} \qquad \text{formula (2)}$$

wherein OL represents the overlapping area, n represents the number of the probes adopted in the leakage inspection unit 230 (i.e., the probe 232), i represents the number of times that the probe 232 traverses between the first edge 222 and the second edge 224, w represents the length of each of the probes adopted in the leakage inspection unit 230 (i.e., the probe 232), y represents the height of the air filter 220, and fw represents the width of the frame 240.

The i value obtained from formula (1) and other conditions (n'w'y and fw) are substituted into formula (2) so the overlapping area OL can be calculated. Then, the designed distance d of the probe 232 moving along the extending direction D2 of the second edge 224 can be determined according to the overlapping area OL. For example, the overlapping area OL obtained by calculating can be divided by the thickness t of the probe 232, thereby obtaining the designed distance d. In this embodiment, the designed distance d is about half of the length w of the probe 232.

Since the designed distance d is less than the length w of the probe 232, each time when the probe 232 traverses between the first edge 222 and the second edge 224, the probe 232 can reconfirm the result of the leak inspection on the air filter 220, such as leakage location and the leakage quantity. In other words, the inspection of the air filter 220 may have good accuracy by using the method of this embodiment.

Figure 5:
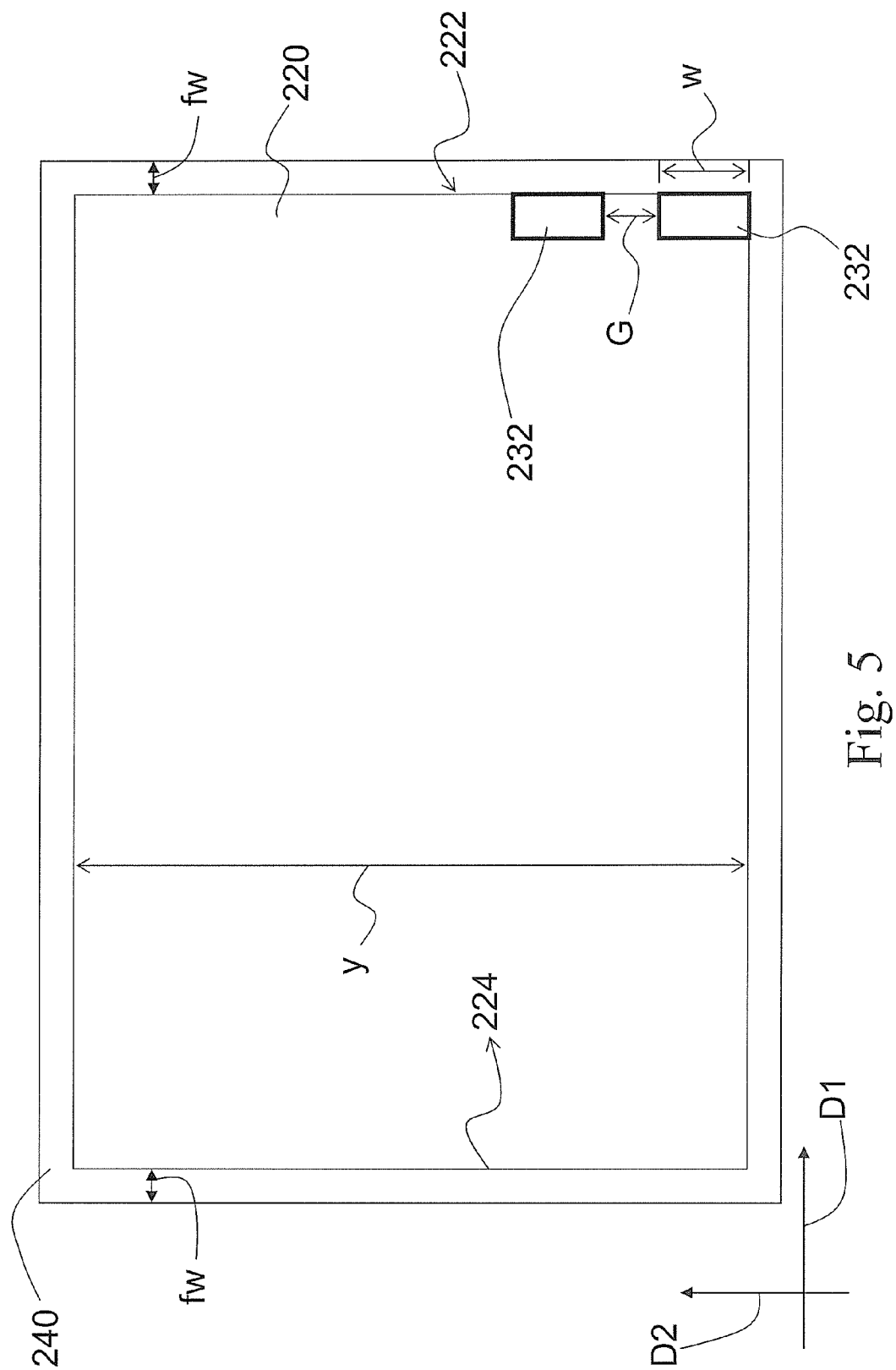
FIG. 5 is a schematic view showing an air filter leak inspection performed by using two probes according to another embodiment of the present invention.

FIG. 5 is a schematic view showing that an air filter leak inspection performed by using two probes according to another embodiment of the present invention. Referring to FIG. 5, in such an embodiment, for example, the leak inspection is proformed by using two probes 232 simultaneously. In the embodiment shown in FIG. 5, before performing the leak inspection with the probes 232, adjustment of a distance G between two probes 232 is performed according to formula (3), $$G = OL \times 2 - w \qquad \text{formula (3)}$$

wherein G represents the distance between two adjacent probes 232, OL represents the overlap area, and w represents the length of each of the probes adopted in the leakage inspection unit 230 (i.e., the two probes 232). In other embodiments which are not illustrated in the drawings of the present invention, more than two probes can be used for performing the leak inspection. Similarly, the distance G between a plurality of probes also can be obtained by using the above mentioned formula (3).

On the other hand, at the step of setting the moving procedure mentioned above, moving the probes 232 to a $j^{th}$ starting position before the probes 232 traverse between the first edge 222 and the second edge 224 in the $j^{th}$ time is further included, wherein j indicates a positive integer, and j is under or equal to the number of times that the probes 232 traverse between the first edge 222 and the second edge 224. For the sake of easier comprehension, this part is illustrated hereinafter with an embodiment of performing leak inspection using one probe 232.

Figure 6:
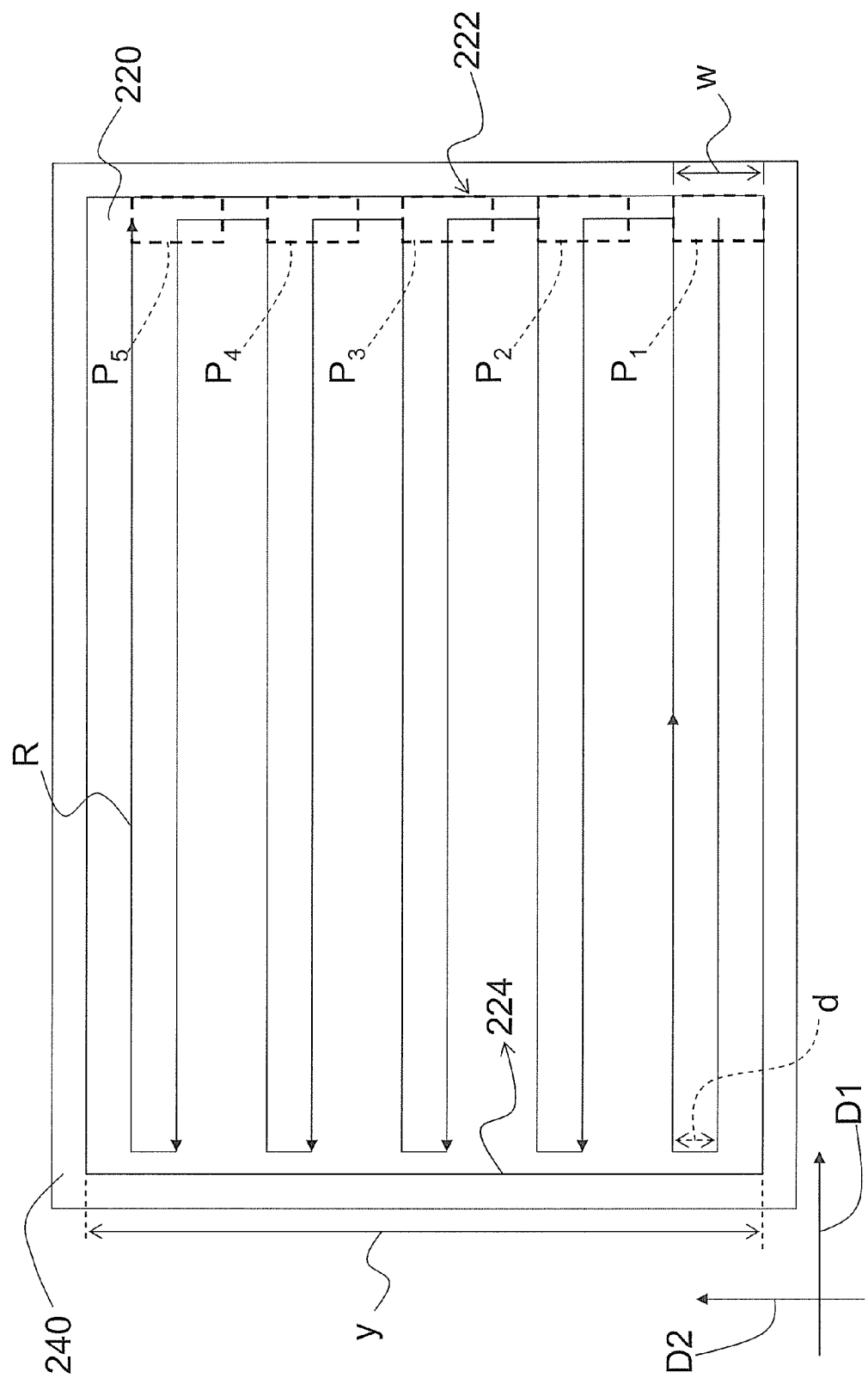
FIG. 6 is a schematic view of the $j^{th}$ starting position of the probe according to an embodiment of the present invention.

FIG. 6 is a schematic view of the $j^{th}$ starting position of the probe according to an embodiment of the present invention. Referring to FIGS. 3 and 6, after the probe 232 moves along the extending direction D2 of the second edge 224 for the designed distance d, the probe 232 would proceed to move along the horizontal direction D1 to the first edge 222. Afterward, before the probe 232 proceeds to move from the first edge 222 to the second edge 224 along the horizontal direction D1, the probe 232 would move to the $j^{th}$ starting portion (such as P1, P2, P3, P4 or P5) in advance.

Specifically, at the step of setting the moving procedure, for example, the probe 232 is moved to the $j^{th}$ starting position according to formula (4), $$P_j = (w+G) \times n + PO + P_{j-1} \qquad \text{formula (4)}$$

wherein $P_j$ represents the $j^{th}$ starting position, $P_{j-1}$ represents the $j-1^{th}$ starting position, w represents the length of each probe 232, G represents the distance between two adjacent probes, and PO represents a probe offset compensation parameter. In this embodiment, the probe offset compensation parameters PO is, for example, equal to the designed distance d.

Since only one probe 232 is used for performing the leak inspection in this embodiment, the distance G between the probes 232 is equal to zero, and the $j^{th}$ starting position would be equal to the $j-1^{th}$ starting position plusing the length w of the probe 232 and the designed distance d. The $j^{th}$ starting position of this embodiment is described as an example, in fact, the $j^{th}$ starting position could be any position on the air filter 220, and the probe offset compensation parameters PO further includes, for example, the compensation of the mechanical motion. In addition, those having ordinary skilled in the art should obtain the $j^{th}$ starting position of a plurality of probes according to formula (4) mentioned above.

From the illustration of the above embodiments, the number of times that the probe 232 traverses between the first edge 222 and the second edge 224 can be determined according to formula (1), and the designed distance d of the probe 232 moving along the extending direction D2 of the second edge 224 can be determined according to formula (2). When using a plurality of probes, the distance G between the probes can be adjusted according to formula (3) before performing the leak inspection. Besides, the starting position of the probes before each time traversing between the first edge 222 and the second edge 224 can be determined according to formula (4).

In brief, the required moving path R of the probe 232 can be designed by calculation with the simple formula mentioned above in this invention. In this embodiment, for example, the data of required moving path R of the probe 232 can be input to the back-end processing unit 238 as illustrated in FIG. 1, so that the transmission mechanism 234 carries and moves the probe 232 according to the input moving path R, thereby scanning the entirety of the air filter 220. Therefore, the probe 232 can complete the leak inspection effectively in the entirety of the air filter 220, and equipment damage caused by the probe 232 going beyond the range of the air filter 220 can be avoided.

Moreover, in the above embodiment, for example, the moving speed of the probe 232 may also be set at the step of setting the moving procedure. For example, in one embodiment, the moving speed of the probe 232 is set between 20 mm/s to 150 mm/s, and the result is shown under Table 1.

TABLE 1

| Moving speed | Leak position | | |
| --- | --- | --- | --- |
| (mm/sec.) | (−320, 165) | (−530, 217) | (−905, 68) |
| 20 | detectable | detectable | detectable |
| 30 | detectable | detectable | detectable |
| 40 | detectable | detectable | detectable |
| 50 | detectable | detectable | detectable |
| 60 | detectable | detectable | detectable |
| 70 | detectable | detectable | detectable |
| 80 | detectable | detectable | detectable |
| 100 | detectable | detectable | detectable |
| 120 | detectable | detectable | detectable |
| 150 | detectable | detectable | detectable |

As shown in Table 1, when the probe 232 performs a leak inspection on a air filter, the results of the leak inspection are consistent, and the probe 232 can detect the leakage location of the air filter effectively. In other words, the air filter leak inspection method of the present invention can accomplish the air filter leak inspection effectively. It should be noted that the aforementioned implementation is just an example, where the moving speed of the probe 232 is not limited in the present invention.

In view of the above, the air filter leak inspection method of the present invention determines the moving path of the probe according to the probes used and the size of the air filter. Moreover, when the probe moves around the filter in cycles, the result of the leak inspection can be reconfirmed. Therefore, the air filter leak inspection method of present invention can improve the air filter leak inspection efficiency and accuracy, and avoid equipment damage. In some embodiments, the air filter leak inspection of the present invention can perform the leak inspection with more than two probes and obtain the optimum distance between the probes by a simple formula calculation. Therefore, the efficiency of the air filter leak inspection is further improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An air filter leak inspection method, comprising:
    passing an aerosol to be filtered containing particles through an air filter from one side of the air filter, wherein the air filter has a first edge and a second edge parallel to each other;
    providing a leakage inspection unit at the other side of the air filter, wherein the leak inspection unit includes n probes, and n indicates a positive integer, and the probes face to the air filter; and
    setting a moving procedure to traverse the probes between the first edge and the second edge, thereby scanning the entirety of the air filter,
    wherein, when the probes move to the second edge, the probes move along the extending direction of the second edge for a designed distance, the designed distance is less than the length of each probe, the number of times that the probes traverse between the first edge and the second edge is determined according to the number of the probes, the length of the each probe and the height of the air filter,
    wherein the step of setting the moving procedure, comprises determining the number of times that the probes traverse between the first edge and the second edge according to the following formula (1), $$(n \times 2) \times i \times w \geq ((n \times 2) \times i - 1) \times C + y \qquad \text{formula (1)}$$

wherein n represents the number of probes, i represents the number of times that the probes traverse between the first edge and the second edge, w represents the length of each probe, C represents a compensation value, and y represents the height of the air filter.

2. The air filter leak inspection method of claim 1, wherein the probes move from the first edge to the second edge along a horizontal direction or move from the second edge to the first edge along the horizontal direction, and the horizontal direction is orthogonal to the extending direction of the second edge.

3. The air filter leak inspection method of claim 1, wherein C is equal to 5.

4. The air filter leak inspection method of claim 3, wherein the position of each probe before moving along the extending direction of the second edge for the designed distance forms an overlapping area with the position of each probe after moving along the extending direction of the second edge for the designed distance, and the overlapping area is represented by the following formula (2), $$OL = \frac{((n \times 2) \times (i/2) \times w) - (y - (fw \times 2) + 2)}{(((n \times 2) \times (i/2) \times w) - 1) - w} \qquad \text{formula (2)}$$

wherein OL represents the overlapping area, n represents the number of probes, i represents the number of times that the probes traverse between the first edge and the second edge, w represents the length of each probe, y represents the height of the air filter, and fw represents the width of the frame.

5. The air filter leak inspection method of claim 1, wherein the air filter is fixed to a frame.

6. The air filter leak inspection method of claim 5, wherein the step of setting the moving procedure further comprises determining the designed distance of the probes moving along the extending direction of the second edge according to the overlapping area.

7. The air filter leak inspection method of claim 6, wherein before moving the probes further comprises adjusting the distance between the probes according to the following formula (3), $$G = OL \times 2 - w \qquad \text{formula (3)}$$

wherein G represents the distance between two adjacent probes, OL represents the overlapping area, and w represents the length of each probe.

8. The air filter leak inspection method of claim 7, wherein the step of setting the moving procedure further comprises moving each probe to the $j^{th}$ starting position according to the following formula (4), $$P_j=(w+G)\times n+PO+P_{j-1} \quad \text{formula (4)}$$

wherein $P_j$ represents the $j^{th}$ starting position, $P_{j-1}$ represents the $j-1^{th}$ starting position, w represents the length of each probe, G represents the distance between two adjacent probes, and PO represents a probe offset compensation parameter.

9. The air filter leak inspection method of claim 5, wherein the leakage inspection unit comprises a plurality of probes.

10. The air filter leak inspection method of claim 1, wherein the step of setting the moving procedure further comprises moving the probes to a $j^{th}$ starting position before the probes traverse between the first edge and the second edge in the $j^{th}$ time, wherein j indicates a positive integer, and j is under or equal to the number of times that the probes traverse between the first edge and the second edge.

11. The air filter leak inspection method of claim 10, wherein the probe offset compensation parameter is equal to the designed distance.

12. The air filter leak inspection method of claim 11, wherein the moving speed of the probes is set between 20 mm/s to 150 mm/s.

13. The air filter leak inspection method of claim 1, wherein at the step of setting the moving procedure, further comprises setting a moving speed of the probes.

14. The air filter leak inspection method of claim 1, wherein the leakage inspection unit further comprises:
 a transmission mechanism, wherein the probes are disposed on the transmission mechanism, and the transmission mechanism is suitable for carrying and moving the probes;
 n particle counters, wherein each particle counter is connected to one of the probes; and
 a back-end processing unit, wherein the back-end processing unit connects to the transmission mechanism and the particle counters, so as to control the motion of the transmission mechanism, and readout and process the output signals of the particle counters.

* * * * *